(12) United States Patent
Jiang et al.

(10) Patent No.: US 8,440,753 B2
(45) Date of Patent: May 14, 2013

(54) POLYCARBONATE COMPOSITIONS, METHODS OF MANUFACTURE THEREOF AND ARTICLES COMPRISING THE SAME

(75) Inventors: Siguang Jiang, Shanghai (CN); Yanjun Li, Shanghai (CN); Xiangping Zou, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 604 days.

(21) Appl. No.: 12/277,883

(22) Filed: Nov. 25, 2008

(65) Prior Publication Data

US 2009/0239988 A1 Sep. 24, 2009

Related U.S. Application Data

(60) Provisional application No. 61/038,156, filed on Mar. 20, 2008.

(51) Int. Cl.
| | |
|---|---|
| B32B 27/28 | (2006.01) |
| C08K 5/09 | (2006.01) |
| C08K 5/10 | (2006.01) |
| C08K 3/10 | (2006.01) |
| C08K 3/22 | (2006.01) |
| C08K 3/18 | (2006.01) |
| C08K 3/30 | (2006.01) |
| C08K 3/40 | (2006.01) |
| C03C 17/34 | (2006.01) |
| B60C 1/00 | (2006.01) |

(52) U.S. Cl.
USPC ........... 524/300; 524/413; 524/430; 524/420; 524/494

(58) Field of Classification Search .................. 524/300, 524/413, 430, 420, 494
See application file for complete search history.

(56) References Cited

U.S. PATENT DOCUMENTS

| | | | |
|---|---|---|---|
| 5,015,670 A | 5/1991 | Takada et al. | |
| 5,102,740 A | 4/1992 | Thurm et al. | |
| 5,153,247 A | 10/1992 | Okamura et al. | |
| 5,451,632 A * | 9/1995 | Okumura et al. | 524/537 |
| 5,510,398 A * | 4/1996 | Clark et al. | 523/171 |
| 5,534,584 A | 7/1996 | Kitamura et al. | |
| 6,664,313 B2 * | 12/2003 | Hirai et al. | 523/209 |
| 6,987,141 B2 | 1/2006 | Okamoto et al. | |
| 2003/0083408 A1 | 5/2003 | Bienmuller et al. | |
| 2004/0152806 A1* | 8/2004 | Koga et al. | 524/115 |
| 2006/0287422 A1* | 12/2006 | Volkers et al. | 524/417 |
| 2007/0021539 A1* | 1/2007 | Shibuya et al. | 524/156 |
| 2007/0179233 A1* | 8/2007 | Isozaki et al. | 524/418 |
| 2007/0232744 A1 | 10/2007 | Volkers et al. | |

FOREIGN PATENT DOCUMENTS

| | | |
|---|---|---|
| CN | 1223279 | 7/1999 |
| CN | 1760270 A1 | 4/2006 |
| DE | 4036590 A1 | 9/1991 |
| EP | 1583795 | 10/2005 |
| EP | 1770126 A1 | 4/2007 |
| JP | 2002356600 A | 12/2002 |
| JP | 2003226805 A | 8/2003 |
| JP | 2006509902 A | 7/2004 |
| JP | 2006037030 A | 2/2006 |
| WO | 03095558 A1 | 11/2003 |
| WO | WO 2005085353 A1 * | 9/2005 |
| WO | 2008005655 A2 | 1/2008 |

OTHER PUBLICATIONS

International Search Report dated Jun. 22, 2009 for App # PCT/IB2009/051168.
Database WPI Week 200614 Thomson Scientific, London, GB; An 2006-130862 XP002531581.

* cited by examiner

*Primary Examiner* — Katarzyna Wyrozebski Lee
*Assistant Examiner* — Anthony H Sheh
(74) *Attorney, Agent, or Firm* — Cantor Colburn LLP

(57) ABSTRACT

Disclosed herein is a polycarbonate composition comprising polycarbonate; a colorant composition that comprises a white colorant in an amount of about 1 to about 15 wt %, based on the total weight of the polycarbonate composition; a fibrous composition; and an acid composition; wherein the weight ratio of the acid composition to the colorant composition is about 0.0001:1 to about 1:1. Disclosed herein too is a method comprising blending a polycarbonate composition that comprises polycarbonate; a colorant composition that comprises a white colorant in an amount of about 1 to about 15 wt %, based on the total weight of the polycarbonate composition; a fibrous composition; and an acid composition; wherein the weight ratio of the acid composition to the colorant composition is about 0.0001:1 to about 1:1.

32 Claims, No Drawings

POLYCARBONATE COMPOSITIONS, METHODS OF MANUFACTURE THEREOF AND ARTICLES COMPRISING THE SAME

CROSS-REFERENCE TO RELATED APPLICATIONS

This application claims priority to provisional application 61/038,156 filed on Mar. 20, 2008, the entire contents of which are hereby incorporated by reference.

BACKGROUND OF THE INVENTION

This disclosure relates to polycarbonate compositions, methods of manufacture thereof and articles comprising the same.

Polycarbonate is an optically transparent polymeric resin that has high impact strength but a low modulus of elasticity. To increase the modulus of elasticity, glass fibers are usually added to the polycarbonate. This results in a loss of transparency as well as a reduction in the impact strength. When it is desired to change the color of glass filled polycarbonate composite, colorants are generally added to the composite. However, the addition of colorants generally reduces the impact properties of glass-reinforced polycarbonate.

In order to render a glass filled polycarbonate white or light in color, fillers such as titanium dioxide and zinc sulfide are often added to the polycarbonate resin. The addition of titanium dioxide to the polycarbonate however, causes a reduction in the size of the glass fibers, while the addition of the zinc sulfide causes a reduction in the molecular weight of the polycarbonate with a corresponding loss in impact strength. As a result of this decrease in impact strength, it is difficult to use white colored glass-filled polycarbonates in applications such as the exterior body panels of automobiles and electronic devices, computers and mobile phones, where the retention of impact strength is desirable.

It is therefore desirable to have a white colored glass-filled polycarbonate that has a high impact strength.

BRIEF DESCRIPTION OF THE INVENTION

Disclosed herein is a polycarbonate composition comprising polycarbonate; a colorant composition that comprises a white colorant in an amount of about 1 to about 15 wt %, based on the total weight of the polycarbonate composition; a fibrous composition; and an acid composition; wherein the weight ratio of the acid composition to the colorant composition is about 0.0001:1 to about 1:1.

Disclosed herein too is a method comprising blending a polycarbonate composition that comprises polycarbonate; a colorant composition that comprises a white colorant in an amount of about 1 to about 15 wt %, based on the total weight of the polycarbonate composition; a fibrous composition; and an acid composition; wherein the weight ratio of the acid composition to the colorant composition is about 0.0001:1 to about 1:1.

DETAILED DESCRIPTION OF THE INVENTION

Disclosed herein is a polycarbonate composition comprising polycarbonate, a fibrous composition, a colorant composition and an acid composition that has an impact strength of greater than or equal to about 120 Joules per meter. The addition of the acid composition facilitates the preservation of impact strength in the white colored composition. The addition of the acid composition prevents the degradation of the molecular weight of the polycarbonate, which helps with the retention of impact strength of the polycarbonate composition.

The polycarbonate prior to compounding generally has a number average molecular weight of about 10,000 to about 100,000, about 12,000 to about 80,000, and more specifically about 15,000 to about 50,000 grams per mole.

The polycarbonate is used in the polycarbonate composition in an amount of about 5 to about 90 weight percent (wt %), specifically about 10 to about 80 wt %, and more specifically about 20 to about 70 wt %, based on the total weight of the polycarbonate composition.

The fibrous composition comprises non-black fibers such as, for example, glass fibers, polymeric fibers, whiskers, nanofibers, nanotubes, or the like, or a combination comprising at least one of the foregoing fibers. Exemplary fibers are glass fibers.

Useful glass fibers can be formed from any type of fiberizable glass composition and include those prepared from fiberizable glass compositions known as "E-glass," "A-glass," "C-glass," "D-glass," "R-glass," "S-glass," as well as E-glass derivatives that are fluorine-free and/or boron-free. Most reinforcement mats comprise glass fibers formed from E-glass and are included in the polycarbonate composition.

Commercially produced glass fibers having nominal filament diameters of about 4.0 to about 35.0 micrometers, and E-glass fibers having nominal filament diameters of about 5.0 to about 30.0 micrometers may be included in the polycarbonate composition. The filaments are made by standard processes, e.g., by steam or air blowing, flame blowing, and mechanical pulling. Exemplary filaments for polycarbonate reinforcement are made by mechanical pulling. Use of non-round fiber cross sections are also possible. The glass fibers may be sized or unsized. Sized glass fibers are coated on their surfaces with a sizing composition selected for compatibility with the polycarbonate. The sizing composition facilitates wet-out and wet-through of the polycarbonate upon the fiber strands and assists in attaining desired physical properties in the polycarbonate composition.

The glass fibers are preferably glass strands that have been sized. In preparing the glass fibers, a number of filaments can be formed simultaneously, sized with the coating agent and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt %, about 0.1 to 2 wt % based on the weight of the glass fibers. Generally, this may be about 1.0 wt % based on the weight of the glass filament. Glass fibers in the form of chopped strands may have a length of about 0.3 millimeter to about 10 centimeters, specifically about 0.5 millimeter to about 5 centimeters, and more specifically about 1.0 millimeter to about 2.5 centimeters.

In general, the fibrous composition is present in the polycarbonate composition in an amount of about 2 to about 60 wt %, specifically about 5 to about 50 wt %, and more specifically about 7 to about 40 wt %, based on the total weight of the polycarbonate composition.

The colorant composition used in the polycarbonate compositions generally comprises white colorants. The colorant composition may have colorant particles that have an average particle size of about 0.1 to about 25 micrometers, specifically about 0.2 to about 20 micrometers, and more specifically about 0.3 to about 15 micrometers. Examples of suitable colorants are titanium dioxide, zinc sulfide, lithopone, zinc oxide, or the like, or a combination comprising at least one of the foregoing colorants.

The colorant composition may be added to the polycarbonate composition in an amount of about 0.5 to about 20 wt %, specifically about 1 to about 15 wt %, specifically about 2 to about 12 wt %, and more specifically about 3 to about 10 wt %, based on the total weight of the polycarbonate composition.

The acid composition is generally added to the polycarbonate composition to prevent the degradation in molecular weight of the polycarbonate. The addition of the acid composition to the polycarbonate composition is generally termed an "acid quench". It has inadvertently been discovered when the acid composition is added to a polymeric composition comprising a polycarbonate, glass fibers and the colorant, the impact properties of the polymeric composition are increased to that of a polymeric composition that does not contain the white colorant or increased to that of a polymeric composition that contains other non-white colorants. The white colorant has been found to degrade the molecular weight of the polycarbonate and the addition of the acid mitigates this effect. This facilitates an improvement in the impact strength of the polycarbonate composition. While not wanting to be limited by theory, it is believed that the addition of the acid quenches the reaction that facilitates the degradation in molecular weight of the polycarbonate.

The acid composition comprises an acid and optionally water. It is generally desirable to have the acid present in an amount of about 1 to about 100 wt %, specifically about 5 to about 60 wt %, specifically about 10 to about 55 wt %, and more specifically about 15 to about 50 wt %, based on the total weight of the acid composition. Acids may include organic acids, inorganic acids, acidic salts, fatty acids, polymeric acids, or the like, or a combination comprising at least one of the foregoing acids. Suitable acids are phosphorous acid, phosphoric acid, hydrochloric acid, sulfuric acid, acetic acid, sodium acid pyrophosphate or the like, or a combination comprising at least one of the foregoing acids. Fatty acids can be saturated or unsaturated acids. Examples of fatty acids are oleic acid, linoleic acid, myristoleic acid, palmitoleic acid, arachidonic acid, or the like, or a combination comprising at least one of the foregoing acids. Examples of polymeric acids are polyacrylic acid, polystyrene sulfonic acid, poly(3-thiopheneacetic acid), polyglycolic acid, or the like, or a combination comprising at least one of the foregoing polymeric acids. An exemplary acid is phosphorous acid.

The acid composition is added to the polycarbonate composition in an amount of about 0.0001 to about 5 wt %, specifically about 0.001 to about 3 wt %, and more specifically about 0.01 to about 2 wt %, based on the total weight of the polycarbonate composition.

It is generally desirable for the weight ratio of the acid composition to the colorant composition to be about 0.0001:1 to about 1:1, specifically about 0.0005:1 to about 0.5:1, specifically about 0.005:1 to about 0.3:1, specifically about 0.002:1 to about 0.2:1, and more specifically about 0.001:1 to about 0.1:1.

In one embodiment, in one method of manufacturing the polycarbonate composition, the polycarbonate together with the fibrous composition, the colorant composition and the acid composition are blended under conditions of shear and temperature effective to produce a homogeneous composition that has an impact strength greater than or equal to about 120 joules per meter. An exemplary form of blending involves melt blending, which comprises melting the polycarbonate and dispersing the fibrous composition, the colorant composition and the acid composition into the molten polycarbonate. Dry blending of the aforementioned ingredients may be conducted prior to the melt blending. The melt blending may result in the formation of an intermediate product such as, for example, pellets or briquettes that can be subsequently manufactured into an article or it may result in the direct formation of articles via a molding process.

Melt blending of the polycarbonate composition involves the use of shear force, extensional force, compressive force, ultrasonic energy, electromagnetic energy, thermal energy or combinations comprising at least one of the foregoing forces or forms of energy, and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces may be conducted in machines such as single or multiple screw extruders, Buss kneaders, Henschel mixers, helicones, Ross mixers, Banbury, roll mills, molding machines such as injection molding machines, vacuum forming machines, blow molding machines, or the like, or a combination comprising at least one of the foregoing machines.

In one embodiment, the polycarbonate composition may be prepared by pre-combining (dry-blending) the polycarbonate, the glass fiber, the colorant and the acid composition prior to being fed into a melt blending device, although such pre-combining may not always be desired. The pre-combining may be carried out in a mixer such as, for example, a drum mixer, ribbon mixer, vertical spiral mixer, Muller mixer, sigma mixer, chaotic mixer, static mixer, and the like. Pre-combining is generally carried out at room temperature.

A melt blend is one where at least a portion of the polycarbonate has reached a temperature greater than or equal to about its flow point (e.g., the glass transition temperature). A dry blend is one where the entire mass of the polycarbonate is at a temperature less than or equal to about its flow point and wherein the polycarbonate is substantially free of any liquid-like fluid during the dry blending process.

In one embodiment, the polycarbonate the fibrous composition, the colorant composition and the acid composition are added to an extruder and undergo melt blending in the extruder. The extrudate is collected and subjected to molding. The aforementioned ingredients may be added to the throat of the extruder or some of them may be added downstream.

In one embodiment, the fibrous composition and/or the colorant composition can be added to the extruder in the form of a masterbatch. The respective masterbatches can be added to the extruder at the throat or downstream if desired. In an exemplary embodiment, the fibrous composition can be added downstream of the throat, specifically just prior to the die of the extruder.

The extrudate is generally collected from the extruder in the form of pellets. The pellets are then molded to form a desired article in an injection molding machine, a blow molding machine, a vacuum forming device, or the like.

The use of the fibrous composition in conjunction with the colorant composition and the acid composition is advantageous in that that the polycarbonate composition displays an impact strength similar to compositions that contain other non-white colorants or displays an impact strength similar to compositions that do not contain colorants.

The polycarbonate composition generally has an impact strength of greater than or equal to about 120 joules per meter, specifically greater than or equal to about 130 joules per meter, and more specifically greater than or equal to about 140 joules per meter In another embodiment, the polycarbonate composition has a heat distortion temperature of greater than or equal to about 132° C., specifically greater than or equal to about 133° C., and more specifically greater than or equal to about 134° C.

The invention is further illustrated by the following non-limiting examples.

EXAMPLES

Example 1

This example was conducted to demonstrate the improvement in impact properties when an acid composition was added to a polycarbonate that contained a fibrous composition and a white colorant composition. This example was also conducted to demonstrate the effect of variations in the amount of phosphorus acid on the thermal and mechanical properties of the sample.

The composition along with the properties are shown in the Table 1. The ingredients were blended in a twin screw extruder. The 100 grade PCP and the PCP 1300 are polycarbonates obtained from Sabic Innovative Plastics. The acrylic polymer impact modified pellets were obtained from Rohm and Haas. All of the ingredients shown in the Table 1 were added to a twin screw extruder via the throat of the extruder. The extruder is a twin screw extruder having 11 barrels set at temperatures of 50, 100, 280, 280, 280, 280, 280, 280, 280, 280 and 280° C., from the throat to the die respectively. The die was set at a temperature of 280° C. The screw speed was 300 revolutions per minute (rpm).

The extruded samples were then subjected to injection molding to produce samples that were tested for a variety of properties. The flexural modulus test was conducted according to ASTM D 790. The notched Izod impact test was conducted according to ASTM D 256. The tensile test was conducted according to ASTM D 638. The heat distortion temperature test was conducted according to ASTM D 648.

As can be seen in the Table 1 below, the Samples #1 and 2 are the comparative samples, while Samples #3-8 are representative of the compositions disclosed herein. The Sample #1 does not contain any white colorant (zinc sulfide), while the Sample #2 contains the white colorant. From the property data, it can be seen that the addition of the white colorant to the Sample #2 reduces the impact properties of the polycarbonate composition by almost 50% (comparing the impact properties of Sample #1 to Sample #2). When the phosphorus acid in an amount of 45 wt % (based on the weight of the acid composition) is added to the polycarbonate composition, the impact properties are significantly improved as can be seen in the Samples #3-8. The amount of the zinc sulfide was maintained at 5 wt %.

From the Samples #3-8 it can be seen that the addition of the acid improves the impact properties of the sample while permitting the addition of a white colorant to the composition.

As can be seen from the data below, when the weight ratio of acid composition to the colorant composition is about 0.0001 to about 1, the impact properties of the polycarbonate composition are significantly improved when compared with comparative compositions that do not contain the acid.

TABLE 1

| Composition | Units | #1 | #2 | #3 | #4 | #5 | #6 | #7 | #8 |
| --- | --- | --- | --- | --- | --- | --- | --- | --- | --- |
| 100 Grade PCP | Wt % | 42.41 | 39.44 | 39.43 | 39.42 | 39.40 | 39.39 | 39.37 | 39.35 |
| PCP 1300 | Wt % | 23.11 | 21.08 | 21.08 | 21.07 | 21.07 | 21.06 | 21.06 | 21.05 |
| Phosphite stabilizer | Wt % | 0.10 | 0.10 | 0.10 | 0.10 | 0.10 | 0.10 | 0.10 | 0.10 |
| Pentaerythritol tetrastearate | Wt % | 0.48 | 0.48 | 0.48 | 0.48 | 0.48 | 0.48 | 0.48 | 0.48 |
| Hindered phenol anti-oxidant | Wt % | 0.10 | 0.10 | 0.10 | 0.10 | 0.10 | 0.10 | 0.10 | 0.10 |
| Acrylic polymer impact modifier | Wt % | 4.80 | 4.80 | 4.80 | 4.80 | 4.80 | 4.80 | 4.80 | 4.80 |
| Glass fibers (⅛ inch) | Wt % | 29.00 | 29.00 | 29.00 | 29.00 | 29.00 | 29.00 | 29.00 | 29.00 |
| Zinc sulfide | Wt % | 0.00 | 5.00 | 5.00 | 5.00 | 5.00 | 5.00 | 5.00 | 5.00 |
| Phosphorous acid (45%) | Wt % | 0.00 | 0.00 | 0.01 | 0.03 | 0.05 | 0.07 | 0.09 | 0.12 |
| Physical properties | | | | | | | | | |
| Flexural Modulus | MPa | 6810 | 7720 | 7290 | 6830 | 6810 | 7030 | 7090 | 6930 |
| Heat Distortion Temperature | ° C. | 135 | 130 | 132 | 134 | 135 | 138 | 138 | 138 |
| Notched Izod | J/m | 179 | 92 | 129 | 165 | 158 | 139 | 126 | 117 |
| Melt Flow Ratio (360 seconds) | g/10 min | 5.41 | 13.8 | 12.2 | 5.8 | 4.69 | 3.52 | 3.58 | 3.36 |
| Tensile Strength | MPa | 102.4 | 110.2 | 110 | 103 | 99.9 | 100.4 | 98.4 | 97.7 |
| Tensile Elongation | % | 2.8 | 2.4 | 2.5 | 2.6 | 2.5 | 2.4 | 2.2 | 2.1 |

From the Table 1 it may be seen that when 5 wt % of zinc sulfide are added to the polycarbonate composition to match the white color, an amount of the phosphorous acid aqueous solution equal to 0.03 wt % produces the best impact property results. This result is shown by Sample #4.

Example 2

This example was conducted to show that when the ratio of zinc sulfide to phosphorus acid is optimized, the impact properties of the polycarbonate composition can be improved beyond that of unfilled polycarbonate. The composition and properties are shown in the Table 2.

TABLE 2

| Composition | Units | #9 | #10 |
| --- | --- | --- | --- |
| 100 Grade PCP | Wt % | 40.63 | 40.62 |
| PCP 1300 | Wt % | 21.89 | 21.88 |
| Phosphite stabilizer | Wt % | 0.10 | 0.10 |
| Pentaerythritol tetrastearate | Wt % | 0.48 | 0.48 |
| Hindered phenol anti-oxidant | Wt % | 0.10 | 0.10 |

TABLE 2-continued

| Composition | Units | #9 | #10 |
|---|---|---|---|
| Acrylic polymer impact modifier | Wt % | 4.80 | 4.80 |
| Glass fibers (⅛ inch) | Wt % | 29.00 | 29.00 |
| Zinc sulfide | Wt % | 3.00 | 3.00 |
| Phosphorous acid (45%) | Wt % | 0.00 | 0.018 |
| Physical properties | | | |
| Flexural Modulus | MPa | 7570 | 7050 |
| Heat Distortion Temperature | ° C. | 132 | 136 |
| Notched Izod | J/m | 119 | 192 |
| Melt Flow Ratio (360 seconds) | g/10 min | 15.7 | 6.15 |
| Tensile Strength | MPa | 108 | 101.6 |
| Tensile Elongation | % | 2.4 | 2.8 |

This example was conducted to demonstrate the properties of the polycarbonate composition when glass was added to the composition in an amount of 45 wt %, based on the total weight of the composition. This sample was prepared in a manner similar to that disclosed in Example 1. Table 3 shows the composition and the properties.

TABLE 3

| Composition | Units | #11 | #12 |
|---|---|---|---|
| 100 Grade PCP | Wt % | 28.41 | 28.46 |
| PCP 1300 | Wt % | 11.11 | 11.00 |
| Phosphite stabilizer | Wt % | 0.10 | 0.10 |
| Pentaerythritol tetrastearate | Wt % | 0.48 | 0.48 |
| Hindered phenol anti-oxidant | Wt % | 0.10 | 0.10 |
| Acrylic polymer impact modifier | Wt % | 4.80 | 4.80 |
| Glass fibers | Wt % | 45.00 | 45.00 |
| Zinc sulfide | Wt % | 10.00 | 10.00 |
| Phosphorous acid (45%) | Wt % | 0.00 | 0.06 |
| Physical properties | | | |
| Flexural Modulus | MPa | 12800 | 12200 |
| Heat Distortion Temperature | ° C. | 129 | 131 |
| Notched Izod | J/m | 96.8 | 106 |
| Melt Flow Ratio (360 seconds) | g/10 min | NA | 3.14 |
| Tensile Strength | MPa | 132.2 | 125 |
| Tensile Elongation | % | 1.9 | 2 |

From the Table 3, it may be seen that for a polycarbonate composition containing 45 wt % glass fibers and 10 wt % ZnS, impact properties are improved upon the addition of the acid composition.

Example 4

This example demonstrates how another acid, notably sodium acid pyrophosphate may be used as an acid quench to improve the impact properties of the polycarbonate composition. The samples of this Example were manufactured in a similar manner to those of Example 1. Table 4 shows both the polycarbonate composition as well as the properties of the samples.

TABLE 4

| Composition | Units | #13 | #14 | #15 | #16 |
|---|---|---|---|---|---|
| 100 Grade PCP | Wt % | 39.38 | 39.36 | 39.32 | 39.30 |
| PCP 1300 | Wt % | 21.12 | 21.12 | 21.12 | 21.11 |
| Phosphite stabilizer | Wt % | 0.10 | 0.10 | 0.10 | 0.10 |
| Pentaerythritol tetrastearate | Wt % | 0.48 | 0.48 | 0.48 | 0.48 |
| Hindered phenol anti-oxidant | Wt % | 0.10 | 0.10 | 0.10 | 0.10 |
| Acrylic polymer impact modifier | Wt % | 4.80 | 4.80 | 4.80 | 4.80 |
| Glass fibers | Wt % | 29.00 | 29.00 | 29.00 | 29.00 |
| Zinc sulfide | Wt % | 5.00 | 5.00 | 5.00 | 5.00 |
| Sodium Acid pyrophosphate | Wt % | 0.02 | 0.04 | 0.08 | 0.11 |
| Physical properties | | | | | |
| Flexural Modulus | MPa | 7330 | 7110 | 7100 | 6920 |
| Heat Distortion Temperature | ° C. | 135 | 135 | 136 | 136 |
| Notched Izod | J/m | 154 | 152 | 157 | 142 |
| Melt Flow Ratio (360 seconds) | g/10 min | 9.59 | 12.7 | 10.7 | 7.67 |
| Tensile Strength | MPa | 113.4 | 112.2 | 109 | 105 |
| Tensile Elongation | % | 2.8 | 2.8 | 2.7 | 2.7 |

From the Table 4, it may be seen that the sodium acid pyrophosphate acts in a similar manner to the phosphorus acid to produce polycarbonate compositions that have a higher impact strength and a higher heat distortion temperature than Sample #2 in Table 1 and Sample #11 in Table 3. Both Sample #2 and Sample #11 did not contain any acid. Thus other acids may be used instead of phosphorous acid to minimize the effects of molecular weight degradation brought on by the addition of a white pigment to the polycarbonate composition.

Example 5

This example was conducted to demonstrate that other colorants could be added to the polycarbonate composition. In this example, carbon black, pigment blue and brown were added to the composition in addition to the zinc sulfide. The composition and properties are shown in the Table 5. This sample was manufactured in a manner similar to that described in Example 1.

TABLE 5

| Composition | Units | #17 |
|---|---|---|
| 100 Grade PCP | Wt % | 40.60 |
| PCP 1300 | Wt % | 21.90 |
| Phosphite stabilizer | Wt % | 0.10 |
| Pentaerythritol tetrastearate | Wt % | 0.48 |
| Hindered phenol anti-oxidant | Wt % | 0.10 |
| Acrylic polymer impact modifier | Wt % | 4.80 |
| Glass fibers | Wt % | 29.00 |
| Zinc sulfide | Wt % | 3.00 |
| Phosphorus acid (45%) | Wt % | 0.018 |
| Pigment carbon black, medium color powder | Wt % | 0.0024 |
| Pigment brown 24 | Wt % | 0.0039 |
| Pigment blue 29:77007, sodium alumino sulphone silicate | Wt % | 0.0039 |
| Physical properties | | |
| Flexural Modulus | MPa | 6960 |
| Heat Distortion Temperature | ° C. | 138 |
| Notched Izod | J/m | 153 |
| Melt Flow Ratio (360 seconds) | g/10 min | 4.29 |
| Tensile Strength | MPa | 100.8 |
| Tensile Elongation | % | 2.6 |

From the Table 5, it may be seen that the addition of other colorants to the polycarbonate composition does not adversely affect the physical properties. The impact strength can still keep more than 150 J/m.

Example 6

This example was conducted to demonstrate the use of zinc sulfide in amounts of 12 wt %, based on the total weight of the composition. The weight ratio of the acid composition to the colorant composition is 0.004:1. The samples of this Example were manufactured in a similar manner to those of Example 1. Table 6 shows both the polycarbonate composition as well as the properties of the samples.

TABLE 6

| Composition | Units | #18 | #19 |
|---|---|---|---|
| 100 Grade PCP | Wt % | 36.13 | 36.096 |
| PCP 1300 | Wt % | 17.39 | 17.376 |
| Phosphite stabilizer | Wt % | 0.10 | 0.10 |
| Pentaerythritol tetrastearate | Wt % | 0.48 | 0.48 |
| Hindered phenol anti-oxidant | Wt % | 0.10 | 0.1 |
| Acrylic polymer impact modifier | Wt % | 4.80 | 4.80 |
| Glass fibers (⅛ inch) | Wt % | 29.00 | 29.00 |
| Zinc sulfide | Wt % | 12.00 | 12.00 |
| Phosphorus acid (45%) | Wt % | 0 | 0.048 |
| Physical properties | | | |
| Flexural Modulus | MPa | 7810 | 7350 |
| Heat Distortion Temperature | ° C. | 127 | 131 |
| Notched Izod | J/m | 95.8 | 119 |
| Melt Flow Ratio (360 seconds) | g/10 min | 13.7 | 22.7 |
| Tensile Strength | MPa | 107.1 | 108.1 |
| Tensile Elongation | % | 12.6 | 2.3 |

From the results in the Table 6, it may be seen that with the introduction of the acid composition, the impact strength of the polycarbonate composition is increased from 95.9 J/m to 119 J/m. Thus, even with an amount of zinc sulfide of 12 wt %, a composition containing an acid composition demonstrates an increase in the impact strength over a comparative composition that does not contain the acid composition. This increase in impact strength can be seen for polycarbonate compositions that contain a weight ratio of the acid composition to the colorant composition of 0.004:1

From the above examples, it may be seen that the acid quench helps preserve and even improve mechanical and thermal properties in a polycarbonate composition when a white pigment is added to the polycarbonate composition.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

The invention claimed is:

1. A polycarbonate composition comprising:
   polycarbonate;
   a colorant composition that comprises a white colorant in an amount of about 1 to about 15 weight percent, based on the total weight of the polycarbonate composition;
   a fibrous composition; and
   sodium pyrophosphate and/or an acid composition; wherein the weight ratio of the sodium pyrophosphate or the acid composition to the colorant composition is about 0.0001:1 to about 1:1; where the acid composition *comprises* and acid and *water*.

2. The polycarbonate composition of claim 1, wherein the polycarbonate has a number average molecular weight of about 10,000 to about 100,000 grams per mole.

3. The polycarbonate composition of claim 1, wherein the colorant composition is present in an amount of about 3 to about 12 weight percent, based on the total weight of the polycarbonate composition.

4. The polycarbonate composition of claim 1, wherein the colorant composition comprises titanium dioxide, zinc sulfide, lithopone, zinc oxide or a combination comprising at least one of titanium dioxide, zinc sulfide, lithopone or zinc oxide.

5. The polycarbonate composition of claim 1, wherein the acid composition comprises phosphorous acid, phosphoric acid, hydrochloric acid, sulfuric acid, acetic acid, or a combination comprising at least one of the foregoing acids.

6. The polycarbonate composition of claim 1, comprising about 0.0001 to about 5 weight percent of the acid composition, based on the total weight of the polycarbonate composition.

7. The polycarbonate composition of claim 6, comprising about 0.001 to about 3 weight percent of the acid composition, based on the total weight of the polycarbonate composition.

8. The polycarbonate composition of claim 6, comprising about 0.01 to about 2 weight percent of the acid composition, based on the total weight of the polycarbonate composition.

9. The polycarbonate composition of claim 1, wherein the acid composition comprises an acid, the acid being an inorganic acid, an organic acid, an acidic salt, a polymeric acid, a fatty acid, or a combination comprising at least one of the foregoing acids.

10. The polycarbonate composition of claim 9, wherein the fatty acid is an oleic acid, a linoleic acid, a myristoleic acid, a palmitoleic acid, a arachidonic acid, or a combination comprising at least one of the foregoing acids.

11. The polycarbonate composition of claim 9, wherein the polymeric acid is a polyacrylic acid, a polystyrene sulfonic acid, a poly(3-thiopheneacetic acid), a polyglycolic acid, or a combination comprising at least one of the foregoing polymeric acids.

12. The polycarbonate composition of claim 1, wherein the weight ratio of the acid composition to the colorant composition is about 0.005:1 to about 0.3:1.

13. The polycarbonate composition of claim 1, wherein the weight ratio of the acid composition to the colorant composition is about 0.001:1 to about 0.1:1.

14. The polycarbonate composition of claim 1, wherein the fibrous composition comprises glass fibers.

15. An article comprising the polycarbonate composition of claim 1.

16. A method comprising:
   blending a polycarbonate composition that comprises:
   polycarbonate;
   a colorant composition that comprises a white colorant in an amount of about 1 to about 15 weight percent, based on the total weight of the polycarbonate composition;
   a fibrous composition; and
   an acid composition; wherein the weight ratio of the acid composition to the colorant composition is about 0.0001:1 to about 1:1; where the acid composition comprises an acid and water.

17. The method of claim 16, wherein the blending comprises melt blending.

18. The method of claim 16, further comprising injection molding the polycarbonate composition.

19. An article manufactured by the method of claim 16.

20. A polycarbonate composition comprising:
polycarbonate;
a colorant composition that comprises a white colorant in an amount of about 1 to about 15 weight percent, based on the total weight of the polycarbonate composition;
a fibrous composition; and
an acid composition; wherein the acid composition comprises an inorganic acid, a polymeric acid, a fatty acid, or a combination comprising at least one of the foregoing acids; and wherein the weight ratio of the acid composition to the colorant composition is about 0.0001:1 to about 1:1.

21. The polycarbonate composition of claim 20, wherein the colorant composition is present in an amount of about 3 to about 12 weight percent, based on the total weight of the polycarbonate composition.

22. The polycarbonate composition of claim 20, wherein the colorant composition comprises titanium dioxide, zinc sulfide, lithopone, zinc oxide or a combination comprising at least one of titanium dioxide, zinc sulfide, lithopone or zinc oxide.

23. The poycarbonate of claims 20, wherein The acid composition comprises phosphorous acid, phosphoric acid, hydrochloric acid, sulfuric acid, acetic acid, or a combination comprising at least one of the foregoing acids.

24. The polycarbonate composition of claim 20, comprising about 0.0001 to about 5 weight percent of the acid composition, based on the total weight of the polycarbonate composition.

25. The polycarbonate composition of claim 20, wherein the fatty acid is an oleic acid, a linoleic acid, a myristoleic acid, a palmitoleic acid, a arachidonic acid, or a combination comprising at least one of the foregoing acids.

26. The polycarbonate composition of claim 20, wherein the polymeric acid is a polyacrylic acid, a polystyrene sulfonic acid, a poly(3-thiopheneacetic acid), a polyglycolic acid, or a combination comprising at least one of the foregoing polymeric acids.

27. A polycarbonate composition comprising:
polycarbonate;
a colorant composition that comprises a white colorant in an amount of about 1 to about 15 weight percent, based on the total weight of the polycarbonate composition;
a fibrous composition; and
sodium pyrophosphate; wherein the weight ratio of the sodium pyrophosphate to the colorant composition is about 0.0001:1 to about 1:1.

28. The polycarbonate composition of claim 27, wherein the polycarbonate has a number average molecular weight of about 10,000 to about 100,000 grams per mole.

29. The polycarbonate composition of claim 27, wherein the colorant composition is present in an amount of about 3 to about 12 weight percent, based on the total weight of the polycarbonate composition.

30. The polycarbonate composition of claim 27, wherein the colorant composition comprises titanium dioxide, zinc sulfide, lithopone, zinc oxide or a combination comprising at least one of titanium dioxide, zinc sulfide, lithopone or zinc oxide.

31. The polycarbonate composition of claim 27, wherein the weight ratio of the acid composition to the colorant composition is about 0.005:1 to about 0.3:1.

32. The polycarbonate composition of claim 27, wherein the weight ratio of the acid composition to the colorant composition is about 0.001:1 to about 0.1:1.

* * * * *